(12) United States Patent
Lopez Perez

(10) Patent No.: US 10,309,482 B2
(45) Date of Patent: Jun. 4, 2019

(54) DAMPER FOR AN AUTOMOBILE CLUTCH

(71) Applicant: VALEO EMBRAYAGES, Amiens (FR)

(72) Inventor: Carlos Lopez Perez, Madrid (ES)

(73) Assignee: Valeo Embrayages, Amiens (FR)

( * ) Notice: Subject to any disclaimer, the term of this patent is extended or adjusted under 35 U.S.C. 154(b) by 151 days.

(21) Appl. No.: 15/502,232

(22) PCT Filed: Jun. 23, 2015

(86) PCT No.: PCT/FR2015/051679
§ 371 (c)(1),
(2) Date: Feb. 7, 2017

(87) PCT Pub. No.: WO2016/020585
PCT Pub. Date: Feb. 11, 2016

(65) Prior Publication Data
US 2017/0227086 A1    Aug. 10, 2017

(30) Foreign Application Priority Data

Aug. 8, 2014    (FR) ..................................... 14 57726

(51) Int. Cl.
*F16F 15/121*    (2006.01)
*F16F 15/133*    (2006.01)
*F16F 15/131*    (2006.01)

(52) U.S. Cl.
CPC ........ *F16F 15/1333* (2013.01); *F16F 15/131* (2013.01); *F16F 15/1336* (2013.01); *F16D 2300/22* (2013.01); *F16F 15/1213* (2013.01); *F16F 2230/0064* (2013.01)

(58) Field of Classification Search
None
See application file for complete search history.

(56) References Cited

U.S. PATENT DOCUMENTS

| | | |
|---|---|---|
| 2,551,718 A | 5/1951 | Auten |
| 2,837,902 A | 6/1958 | Stevens et al. |
| 4,145,936 A | 3/1979 | Vincent et al. |
| 4,300,363 A | 11/1981 | Mathues |
| 4,378,220 A | 3/1983 | Seppala et al. |
| 4,488,629 A | 12/1984 | Loizeau |
| 4,646,899 A | 3/1987 | Murakami |
| 4,703,840 A | 11/1987 | Bopp |
| 4,718,530 A | 1/1988 | Loizeau et al. |

(Continued)

FOREIGN PATENT DOCUMENTS

| | | |
|---|---|---|
| DE | 19538722 | 4/1997 |
| DE | 19721236 | 12/1997 |

(Continued)

*Primary Examiner* — Jacob S. Scott
(74) *Attorney, Agent, or Firm* — Berenato & White, LLC

(57) ABSTRACT

A damper for an automobile clutch, comprises input and output elements rotationally movable with respect to one another around a rotation axis (X), and a damping device interposed between the input and output elements. One of the input and output elements is equipped with a cam follower (21). The damping device has a flexible blade (17a; 17b). The flexible blade is provided with a cam surface (20) arranged to interact with the cam follower. The cam surface extends over an opening angle (A) greater than 30°.

19 Claims, 5 Drawing Sheets

(56) References Cited

U.S. PATENT DOCUMENTS

| | | | |
|---|---|---|---|
| 4,795,012 A | 1/1989 | Durum | |
| 4,800,996 A | 1/1989 | Loizeau | |
| 5,066,147 A | 11/1991 | Brandenstein et al. | |
| 5,205,788 A | 4/1993 | Sacher et al. | |
| 5,477,950 A | 12/1995 | Maloof | |
| 5,697,261 A | 12/1997 | Mokdad et al. | |
| 5,823,311 A | 10/1998 | Mokdad | |
| 5,893,355 A | 4/1999 | Glover et al. | |
| 5,908,095 A | 6/1999 | Jaeckel et al. | |
| 6,073,503 A | 6/2000 | Matsuno et al. | |
| 6,176,785 B1 | 1/2001 | Geislinger | |
| 6,224,487 B1 | 5/2001 | Yuergens | |
| 6,398,655 B1 | 6/2002 | Orlamunder et al. | |
| 6,471,024 B2 | 10/2002 | Ota et al. | |
| 6,585,091 B2 | 7/2003 | Reinhart et al. | |
| 8,202,183 B2 | 6/2012 | Riu | |
| 8,257,211 B2 | 9/2012 | Riu | |
| 8,689,952 B2 | 4/2014 | Toshihisa | |
| 9,328,774 B1 * | 5/2016 | Shaw | F16D 3/56 |
| 2001/0032767 A1 | 10/2001 | Reinhart et al. | |
| 2002/0052242 A1 | 5/2002 | Tabuchi et al. | |
| 2002/0162720 A1 * | 11/2002 | Kimura | F16D 7/048 192/55.1 |
| 2003/0106763 A1 | 6/2003 | Kimura et al. | |
| 2003/0226734 A1 | 12/2003 | Uehara | |
| 2008/0171604 A1 | 7/2008 | Chaudhari et al. | |
| 2010/0122605 A1 | 5/2010 | Maienschein | |
| 2015/0369296 A1 | 12/2015 | Lopez-Perez | |
| 2017/0234400 A1 | 8/2017 | Fenioux et al. | |
| 2017/0363195 A1 | 12/2017 | Durham | |

FOREIGN PATENT DOCUMENTS

| | | |
|---|---|---|
| DE | 19729421 | 1/1998 |
| DE | 19808730 | 9/1999 |
| DE | 19919449 | 11/1999 |
| DE | 10017801 | 10/2001 |
| DE | 102004024747 | 12/2005 |
| DE | 102008018218 | 11/2008 |
| DE | 102009050670 | 5/2010 |
| DE | 102010047803 | 4/2011 |
| DE | 102010049929 | 5/2011 |
| EP | 1048420 | 11/2000 |
| EP | 1195536 | 4/2002 |
| EP | 1691107 | 8/2006 |
| EP | 2157336 | 2/2010 |
| EP | 2530354 | 12/2012 |
| FR | 2339107 | 8/1977 |
| FR | 2493446 | 5/1982 |
| FR | 2499182 | 8/1982 |
| FR | 2546251 | 11/1984 |
| FR | 2602560 | 2/1988 |
| FR | 2611013 | 8/1988 |
| FR | 2628804 A1 | 9/1989 |
| FR | 2714435 | 6/1995 |
| FR | 2738606 | 3/1997 |
| FR | 2752278 | 2/1998 |
| FR | 2764958 | 12/1998 |
| FR | 2768208 | 3/1999 |
| FR | 2823275 | 10/2002 |
| FR | 2828543 | 2/2003 |
| FR | 2838490 | 10/2003 |
| FR | 2843432 | 2/2004 |
| FR | 2862730 | 5/2005 |
| FR | 2894006 | 6/2007 |
| FR | 2913256 | 9/2008 |
| FR | 2622620 | 4/2009 |
| FR | 2938030 | 5/2010 |
| FR | 3000155 A1 | 6/2014 |
| GB | 1212042 | 11/1970 |
| GB | 2000257 | 1/1979 |
| GB | 2169380 | 7/1986 |
| GB | 2235749 | 3/1991 |
| GB | 2262795 | 6/1993 |
| GB | 2289558 | 5/1995 |
| GB | 2284875 | 6/1995 |
| GB | 2306620 | 5/1997 |
| GB | 2331132 | 5/1999 |
| GB | 2338773 | 7/2002 |
| GB | 2468030 | 8/2010 |
| JP | 09280317 | 10/1997 |
| JP | 2000192992 | 7/2000 |
| JP | 2011047462 | 3/2011 |
| WO | WO199528580 | 10/1995 |
| WO | WO9914114 A1 | 3/1999 |
| WO | WO9941525 | 8/1999 |
| WO | WO2004016968 | 2/2004 |
| WO | WO2006070422 | 7/2006 |
| WO | WO2007000140 | 1/2007 |
| WO | WO2008004257 | 1/2008 |
| WO | WO2008004258 | 1/2008 |
| WO | WO2009047816 | 4/2009 |
| WO | WO2011006264 | 1/2011 |
| WO | WO2014096735 A1 | 6/2014 |

* cited by examiner

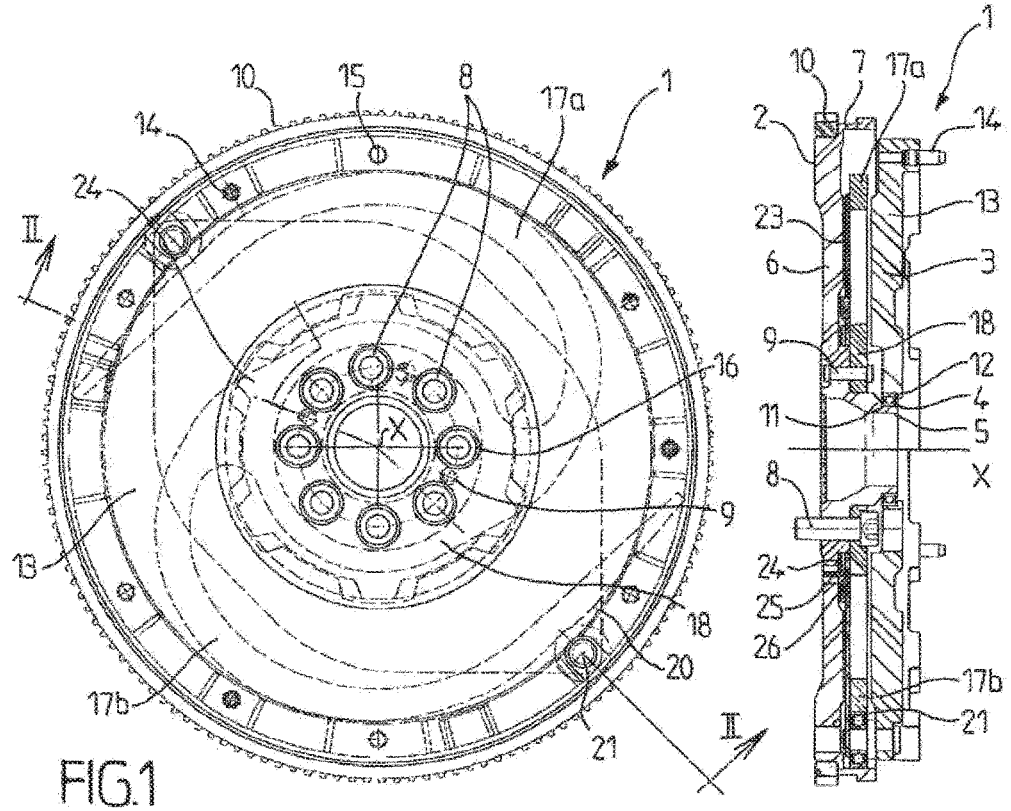
FIG.1
FIG.2
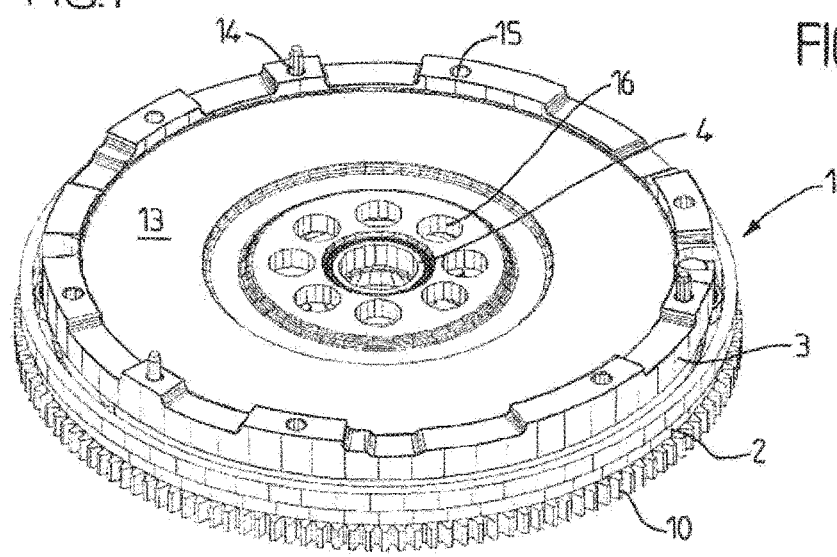
FIG.3

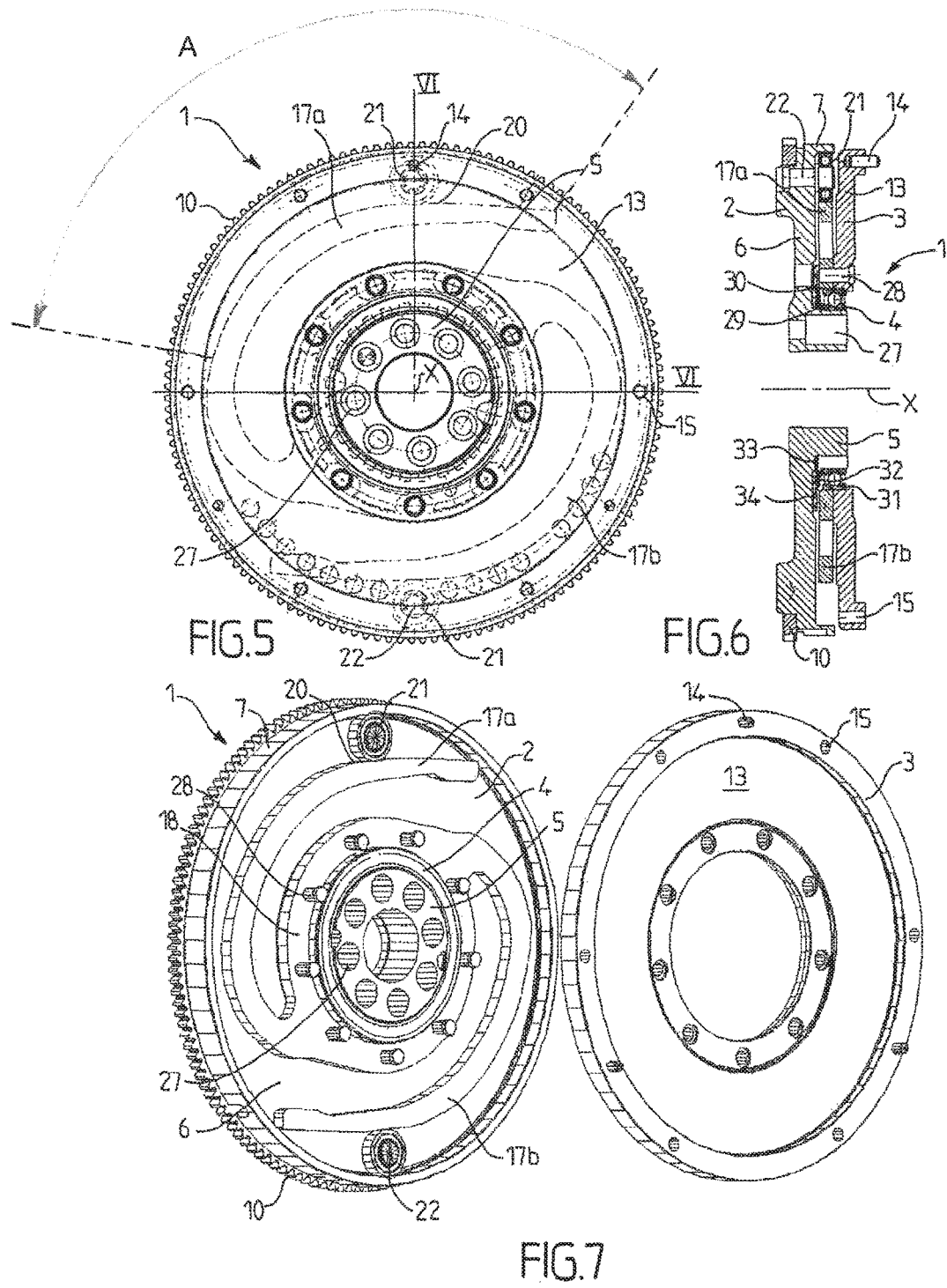

DAMPER FOR AN AUTOMOBILE CLUTCH

CROSS-REFERENCE TO RELATED APPLICATIONS AND CLAIM TO PRIORITY

This application is a national stage application of International Application No. PCT/FR2015/051679 filed Jun. 23, 2015, which claims priority to French Patent Application No. 1457726 filed Aug. 8, 2014, the disclosures of which are incorporated herein by reference and to which priority is claimed.

FIELD OF THE INVENTION

The invention relates to a damper, in particular for an automobile clutch.

BACKGROUND OF THE INVENTION

Patent Application WO 2014/096735 discloses a torsional damper for a torque transmission device, having a first element and a second element rotationally movable with respect to one another around a rotation axis X, and damping means for transmitting a torque and for damping rotational irregularities between the first element and the second element, the damping means having a flexible blade.

SUMMARY OF THE INVENTION

The aim of the invention is to improve this type of damper.

The invention thus relates to a damper, in particular for an automobile clutch, comprising:

an input element and an output element rotationally movable with respect to one another around a rotation axis; and one of the input and output elements is equipped with a cam follower;

a damping device interposed between the input and output elements; the damping device has a flexible blade, and the flexible blade is provided with a cam surface arranged to interact with the cam follower, that cam surface extending over an opening angle greater than 30°, in particular 45°.

Thanks to the invention, since the cam surface of the flexible blade exhibits a relatively large opening angle, it is possible to achieve a relatively large angular deflection between the input element and output element. It is thus easily possible to obtain damping means that operate over a relatively wide range of torques while offering damping characteristic curves whose slope varies relatively progressively.

Advantageously, the cam surface has a substantially concave shape when observed along the rotation axis, that concavity being on the side of the rotation axis.

Preferably, the cam surface is configured radially externally from the blade.

Advantageously, the cam surface is concave over its entire length, that concavity being on the side of the rotation axis.

If desired, the opening angle is greater than 60° or 90°, in particular greater than 110° or 115°.

Preferably, the opening angle is between 90° and 180°.

As applicable, the flexible blade is metallic.

If desired, the flexible blade is constituted by a stack of strips.

If desired, the thickness of the flexible blade is greater than 1 mm, in particular greater than 3 mm, for example between 3 mm and 50 mm.

Preferably, the flexible blade is rotationally coupled to one of the input and output elements.

Advantageously, the cam surface is arranged so that, for an angular deflection between the input element and output element with respect to an inactive angular position, the cam follower exerts a flexural force on the flexible blade, producing a reaction force capable of returning said input and output elements to said inactive angular position.

Preferably, the cam follower is a roller mounted rotationally movably on one of the input and output elements.

Also an object of the invention is a clutch friction disk comprising a damper according to the invention as described above.

Also an object of the invention is a dual mass flywheel damper comprising a damper according to the invention as described above.

The invention also relates, independently or in combination with the above, to a damper for a motor vehicle having:

a primary inertial flywheel intended to be fastened to the end of a crankshaft, and a secondary inertial flywheel, rotationally movable with respect to one another around a rotation axis X;

a damping device for transmitting a torque and for damping rotational irregularities between the primary and secondary inertial flywheels, the damping device having friction members arranged to exert a resistive frictional torque between the primary and secondary inertial flywheels upon an angular deflection between said primary and secondary inertial flywheels;

the damper is notable in that the damping device has a flexible blade, rotationally coupled to one of the primary and secondary inertial flywheels and provided with a cam surface; and in that the damper has a cam follower carried by the other of the primary and secondary inertial flywheels and is arranged to interact with the cam surface;

the cam surface is arranged so that, for an angular deflection between the primary inertial flywheel and the secondary inertial flywheel with respect to an inactive angular position, the cam follower exerts a flexural force on the flexible blade, producing a reaction force capable of returning said primary and secondary inertial flywheels toward said inactive angular position.

The construction and assembly of such a damper are thus simple, since it requires a limited number of components as compared with a damper having helical springs.

The damping device furthermore is less sensitive to centrifugal force than the helical springs of the existing art, so that centrifugal force has only a slight impact on the vibration damping quality.

The structure of such a damper furthermore makes it possible to achieve relatively large deflections, which allows the use of the damping device having a limited stiffness so as to improve their effectiveness.

In addition, a damper of this kind can exhibit a characteristic curve, representing changes in transmitted torque as a function of angular deflection, that exhibits changes in slope having no inflection point or discontinuity. The characteristic curve thus does not have a region of abrupt change in stiffness, which causes discontinuities and jerks that impair damping quality.

Lastly, since the cam surface is carried by the flexible blade, manufacture of a damper according to the invention can in part be standardized. This is because only the geometry and the characteristics of the flexible blade require adaptation when the characteristics of a damper need to be adapted to the characteristics of the intended application.

According to other advantageous embodiments, a damper of this kind can have one or more of the following characteristics:

The cam follower is a roller mounted rotationally movably on the other of said primary and secondary inertial flywheels.

The roller is mounted rotationally movably on the other of said primary and secondary inertial flywheels by means of a rolling bearing.

The damper has a second flexible blade equipped with a cam surface and a second cam follower arranged to interact with the cam surface of said second flexible blade, the first and the second flexible blades being symmetrical with respect to the rotation axis X.

The first and second flexible blades are carried by an annular body.

The first and second flexible blades are integrated with one of said primary and secondary inertial flywheels, each independently.

The damper has a third and a fourth flexible blade equipped with a cam surface, and a third and a fourth cam follower arranged to interact respectively with the cam surface of the third and fourth flexible blades.

The third and fourth flexible blades are carried by a second annular body and are symmetrical with respect to the rotation axis X, the second annular body being offset axially along the axis X with respect to the first annular body.

The third and fourth flexible blades are offset angularly 90° with respect to the first and second flexible blades.

The cam follower is disposed radially externally from the flexible blade.

The flexible blade has a curved region extending circumferentially.

The flexible blade is carried by an annular body that is fastened on the primary inertial flywheel, the cam follower being carried by a rod that extends between the secondary inertial flywheel and a web, the secondary inertial flywheel and the web extending on either side of said annular body.

The primary flywheel has a radially inner hub supporting a bearing for centering the secondary inertial flywheel on the primary inertial flywheel, and an annular region exhibiting passthrough orifices for screws for fastening said damper to the nose of the crankshaft of an engine, extending radially beyond the bearing for centering the secondary inertial flywheel, the annular support body of the flexible blade being equipped with passthrough orifices for said screws for fastening the damper onto the nose of the crankshaft.

The flexible blade is carried by an annular body integral with the secondary wheel, the primary flywheel having a radially inner hub supporting a rolling bearing for centering the secondary inertial flywheel with respect to the primary inertial flywheel, the rolling bearing having an inner ring interacting with the radially inner hub and an outer ring clamped between the annular support body of the flexible blade and the secondary inertial flywheel.

The friction members comprise a first friction washer capable of being rotationally driven by one of the primary and secondary inertial flywheels, and a second friction washer capable of being rotationally driven by the other of the primary and secondary inertial flywheels, and a spring washer of the Belleville type arranged to exert a force pressing the first friction washer against the second friction washer.

BRIEF DESCRIPTION OF THE DRAWINGS

The invention will be better understood, and other objectives, details, characteristics, and advantages thereof will emerge more clearly, in the course of the description below of several particular embodiments of the invention, provided solely for illustrative purposes and non-limiting, with reference to the attached Figures.

In these Figures:

FIG. 1 is a frontal view of a dual mass flywheel damper, in which a secondary inertial flywheel is depicted as being transparent so that a damping device is visible.

FIG. 2 is a section view along II-II of the dual mass flywheel damper of FIG. 1.

FIG. 3 is a perspective view of the dual mass flywheel damper of FIG. 1.

FIG. 5 is a frontal view of a dual mass flywheel damper according to a second embodiment, in which the secondary inertial flywheel is depicted as being transparent so that the damping device is visible.

FIG. 6 is a section view along VI-VI of the dual mass flywheel damper of FIG. 5.

FIG. 7 is a partly exploded perspective view of the dual mass flywheel damper of FIGS. 5 and 6.

Figure 4:
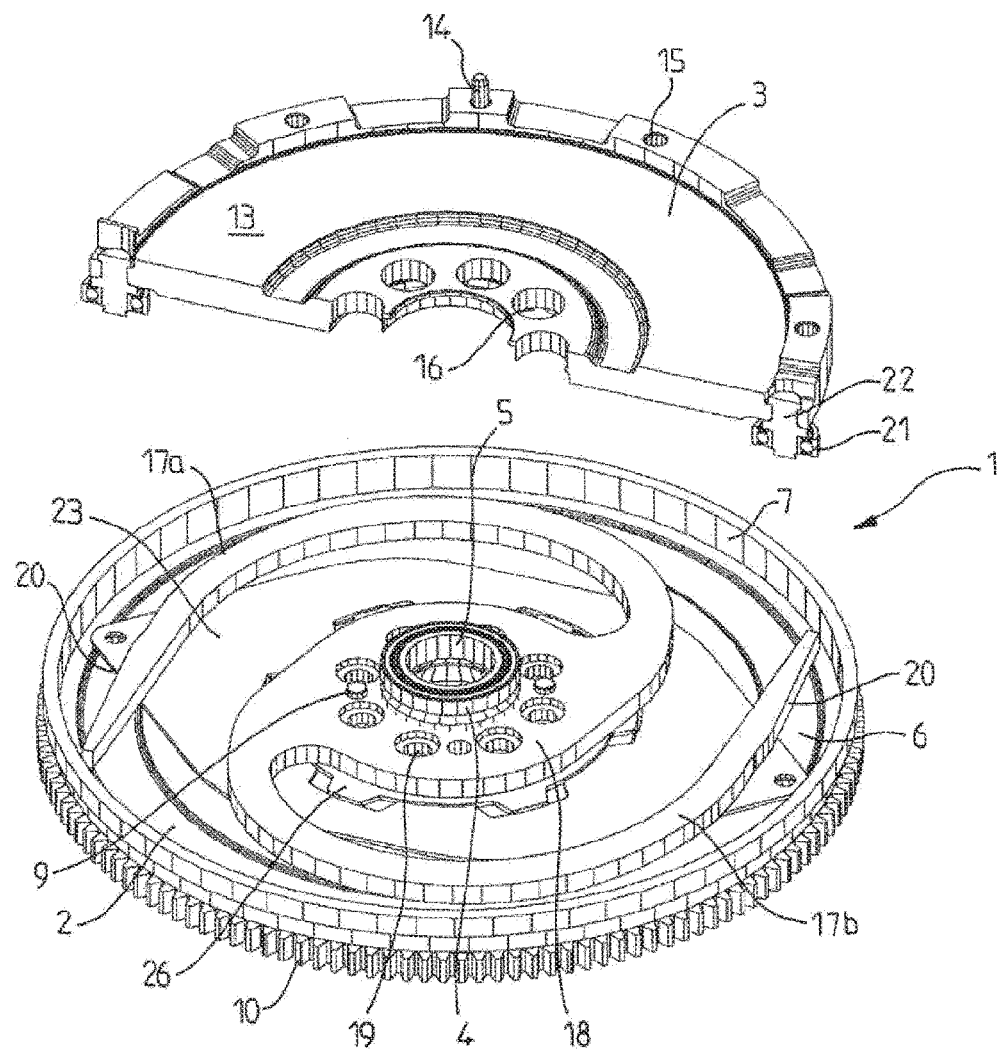
FIG. 4 is a perspective view of the dual mass flywheel damper of FIGS. 1 to 3, in which the secondary inertial flywheel is shown partly detached and disassembled from the primary inertial flywheel.

In the description and the claims, the terms "inner" and "outer," as well as the orientations "axial" and "radial," will be used to designate elements of the dual mass flywheel damper in accordance with the definitions given in the description. By convention, the "radial" orientation is directed orthogonally to the rotation axis X of the dual mass flywheel damper determining the "axial" orientation; and, proceeding from inside to outside moving away from said axis X, the "circumferential" orientation is directed orthogonally to the rotation axis X of the dual mass flywheel damper and orthogonally to the radial direction. The terms "outer" and "inner" are used to define the relative position of one element with respect to another with reference to the rotation axis X of the dual mass flywheel damper; an element close to the axis is thus referred to as "inner" as opposed to an "outer" element located radially at the periphery.

DETAILED DESCRIPTION OF THE PREFERRED EMBODIMENT(S)

Reference is made firstly to FIGS. 1 to 4, which depict a dual mass flywheel damper 1 according to a first embodiment. Dual mass flywheel damper 1 comprises a primary inertial flywheel 2 intended to be fastened to the end of a crankshaft of an internal combustion engine (not depicted), and a secondary inertial flywheel 3 that is centered and guided on primary flywheel 2 by means of a ball-type rolling bearing 4. Secondary flywheel 3 is intended to constitute the reaction plate of a clutch (not depicted) connected to the input shaft of a gearbox. Primary inertial flywheel 2 and secondary inertial flywheel 3 are intended to be mounted movably around a rotation axis X, and are furthermore rotationally movable with respect to one another around said axis X.

The primary inertial flywheel 2 has a radially inner hub 5 supporting rolling bearing 4, an annular region 6 extending radially, and a cylindrical region 7 extending axially, on the side opposite the engine, from the outer periphery of annular region 6. Annular region 6 is equipped on the one hand with passthrough orifices for fastening screws 8 intended for fastening primary flywheel 2 onto the engine crankshaft, and on the other hand with passthrough orifices for rivets 9 for fastening a damping device onto the primary inertial flywheel 2. The primary inertial flywheel 2 carries on its external periphery a ring gear 10 for rotational driving of the primary inertial flywheel 2 with the aid of a starter.

Radially inner hub 5 of the primary flywheel has a shoulder 11, serving for abutment of the inner ring of rolling bearing 4, which retains said inner ring in the direction of the engine. Secondary flywheel 3 similarly has on its inner periphery a shoulder 12 that serves for abutment of the outer ring of rolling bearing 4 and that retains said outer ring in a direction opposite to the engine.

Secondary flywheel 3 has a planar annular surface 13 on the side opposite primary flywheel 2, forming an abutment surface for a friction lining of a clutch disk (not depicted). Secondary flywheel 3 has, close to its outer rim, studs 14 and orifices 15 that serve for mounting of a clutch cover. Secondary flywheel 3 furthermore has orifices 16 disposed facing the orifices constituted in primary flywheel 2 and intended for the passage of screws 8 upon mounting of dual mass flywheel damper 1 on the crankshaft.

The primary flywheel 2 and the secondary flywheel 3 are rotationally coupled via the damping device. In the embodiment depicted in FIGS. 1 to 4, the damping device has two flexible blades 17a, 17b mounted in rotationally coupled fashion to primary flywheel 2. For this, the flexible blades 17a, 17b are carried by an annular body 18 equipped with orifices allowing the passage of the rivets 9 for fastening to the primary flywheel 2. The annular body 18 furthermore has orifices 19 for the passage of the fastening screws 8 for fastening the dual mass flywheel damper 1 to the nose of the crankshaft. The two flexible blades 17a, 17b are symmetrical with respect to the rotation axis X of the clutch disk.

Flexible blades 17a, 17b have, at one free end, a cam surface 20 that is arranged to interact with a cam follower carried by secondary flywheel 3. Flexible blades 17a, 17b have a curved region extending substantially circumferentially. The radius of curvature of the curved region, as well as the length of that curved region, are determined as a function of the desired stiffness of flexible blade 17a, 17b. Flexible blade 17a, 17b selectably can be made as a single piece or can be made up of a plurality of strips disposed axially against one another.

The cam followers are rollers 21 carried by cylindrical rods 22 fastened on the one hand to secondary flywheel 3 and on the other hand to a web 23. Rollers 21 are mounted on cylindrical rods 22 rotationally movably around a rotation axis parallel to rotation axis X. Rollers 21 are kept in abutment against their respective cam surface 20 and are arranged to roll against said cam surface 20 upon a relative motion between primary flywheel 2 and secondary flywheel 3. Rollers 21 are disposed radially externally from their respective cam surface 20 in order to retain flexible blades 17a, 17b radially when they are subjected to centrifugal force. In order to reduce parasitic friction capable of affecting damping functionality, rollers 21 advantageously are mounted rotatably on the cylindrical rods by means of a rolling bearing. As an example, the rolling bearing can be a ball bearing or roller bearing. In an embodiment, rollers 21 have an anti-friction coating.

Cam surface 20 is arranged so that, for an angular deflection between primary flywheel 2 and secondary flywheel 3 with respect to an inactive relative angular position, roller 21 moves on cam surface 20 and, by so doing, exerts a flexural force on flexible blade 17a, 17b. In reaction, flexible blade 17a, 17b exerts on roller 21 a return force that tends to return primary flywheel 2 and secondary flywheel 3 to their inactive relative angular position. Flexible blades 17a, 17b are thus capable of transmitting a driving torque from primary flywheel 2 to secondary flywheel 3 (forward direction) and a resistive torque from secondary flywheel 3 to primary flywheel 2 (reverse direction).

The torsional vibrations and torque inconsistencies that are produced by the internal combustion engine are transmitted by the crankshaft to primary flywheel 2, and generate relative rotations between primary flywheel 2 and secondary flywheel 3. These vibrations and inconsistencies are damped by the flexing of flexible blade 17a.

Referring again to FIGS. 1 to 4, it is apparent that the damping device has friction members arranged so as to exert a resistive torque between primary flywheel 2 and secondary flywheel 3 upon relative deflection thereof. The friction members are thus capable of dissipating the energy accumulated in flexible blades 17a, 17b. The friction means comprise a spring washer 24 of the Belleville washer type, a first friction washer 25 rotationally coupled to primary flywheel 2, and a second friction washer 26 capable of being rotationally driven with respect to primary flywheel 2 upon a relative deflection between primary flywheel 2 and secondary flywheel 3. Spring washer 24 is intercalated between primary flywheel 2 and first friction washer 25, and ensures a compressive force from first friction washer 25 against second friction washer 26. First friction washer 25 is rotationally coupled to primary flywheel 2 by axial fingers, depicted in FIG. 2, fitting into openings configured in primary flywheel 2. Second friction washer 26 has on its outer periphery a tooth set that meshes, with a defined circumferential play, with a tooth set shaped into the inner periphery of web 23. When the circumferential play is taken up upon a relative deflection between primary flywheel 2 and secondary flywheel 3, second friction washer 26 is thus rotationally driven by secondary flywheel 3 and a frictional torque is exerted between the first and second friction washers 25, 26.

FIGS. 5 to 7 illustrate a dual mass flywheel damper 1 according to another embodiment. In this embodiment, primary flywheel 2 has a radially inner hub 5 supporting a centering bearing 4 for secondary flywheel 3, which is provided with orifices 27 for the passage of screws for fastening dual mass flywheel damper 1 to the nose of the crankshaft.

The damping device comprises two flexible blades 17a, 17b that here are mounted in rotationally coupled fashion to secondary flywheel 3 and carry cam surfaces 20 arranged to interact with cam followers carried by primary flywheel 2. Flexible blades 17a, 17b are carried by an annular body 18. Said annular body 18 is fastened on primary flywheel 2 by means of a plurality of rivets 28 that interact with orifices configured in annular body 18 and in primary flywheel 2.

The radially inner hub 5 of primary flywheel 2 has a shoulder 29 serving for abutment of the inner ring of rolling bearing 4 and retaining said inner ring in the direction of the engine. In addition, the outer ring of rolling bearing 4 is clamped between annular body 18, which supports flexible blades 17*a*, 17*b*, and secondary flywheel 3. For this, annular body 18 has on its inner periphery a shoulder 30 retaining the outer ring in the direction of the engine, and secondary flywheel 3 has on its inner periphery a shoulder 31 retaining the outer ring in the opposite direction from the engine.

The cam followers here are rollers 21 mounted on primary flywheel 2 rotationally movably around an axis parallel to rotation axis X. Rollers 21 are mounted on cylindrical rods 22, fastened on primary flywheel 2, by means of rolling bearings.

In addition, the damping device of the dual mass flywheel damper of FIGS. 5 to 7 also have friction members arranged to exert a resistive torque between primary flywheel 2 and secondary flywheel 3 upon relative deflection thereof. The friction members comprise a spring washer 32 of the Belleville type, a first friction washer 33 rotationally coupled to primary flywheel 2, and a second friction washer 34 capable of being rotationally driven with respect to primary flywheel 2 upon a relative deflection between primary flywheel 2 and secondary flywheel 3. Spring washer 32 is axially immobilized in the opposite direction from the engine by a circlip. Spring washer 32 exerts an axial force on first friction washer 33 which grips second friction washer 34 between said first friction washer 33 and primary flywheel 2. First friction washer 33 has on its inner periphery tabs that interact with grooves configured on the outer periphery of hub 5 of primary flywheel 2, in order to rotationally couple first friction washer 33 with primary flywheel 2. Second friction washer 34, for its part, has on its outer periphery indentations capable of interacting, with a defined circumferential play, with the heads of rivets 28 for fastening annular body 18 to secondary flywheel 3, in order to allow a relative motion of second friction washer 34 with respect to primary flywheel 2 upon a relative deflection between primary flywheel 2 and secondary flywheel 3.

As is evident from FIG. 5, cam surface 20 extends over an opening angle A of approximately 115°.

Thanks to this relatively large opening angle, it is possible to achieve a relatively large angular deflection between the input and output elements. It is thus easily possible to obtain the damping device that operates over a relatively wide range of torques while offering damping characteristic curves whose slope varies relatively progressively.

As is evident from FIG. 5, the cam surface 20 has a substantially concave shape over its entire length thereof when observed along the rotation axis, said concavity being on the side of the rotation axis.

That cam surface 20 is configured radially externally on the blade.

As applicable, flexible blade 17*a*, 17*b* is metallic and is constituted by a stack of strips.

In the example described, the thickness of the flexible blade is 16 mm.

The flexible blade is rotationally coupled to one of the input and output elements, and the cam follower is a roller 21 mounted rotationally movably on one of the input and output elements.

Figures 8, 9:
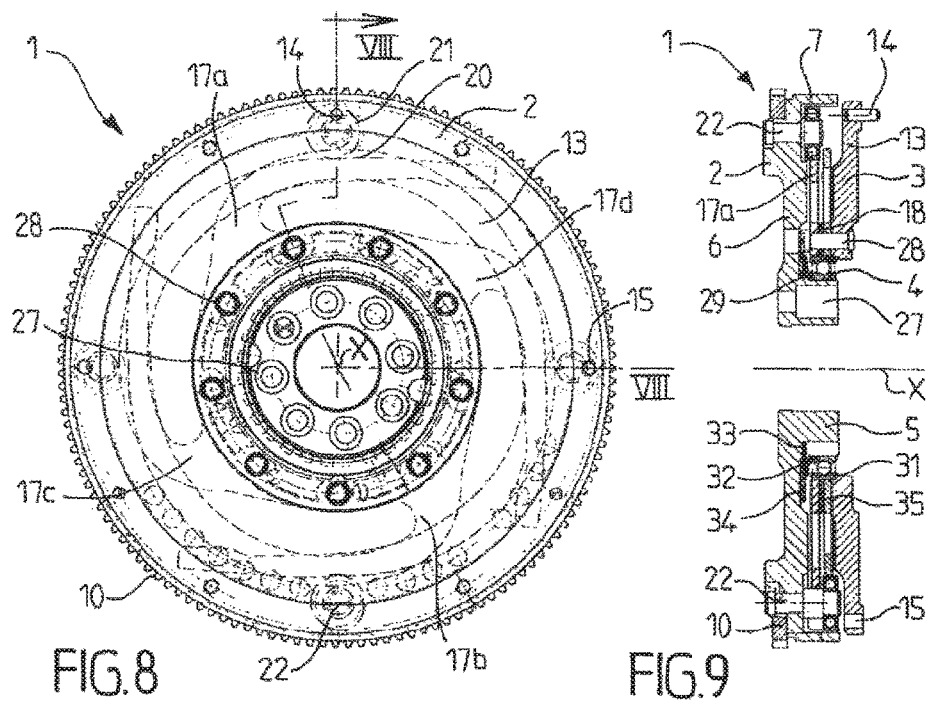
FIG. 8 is a frontal view of a dual mass flywheel damper according to a third embodiment, in which the secondary inertial flywheel is depicted as being transparent so that the damping device is visible.
FIG. 9 is a section view along VIII-VIII of the dual mass flywheel damper of FIG. 8.
Figure 10:
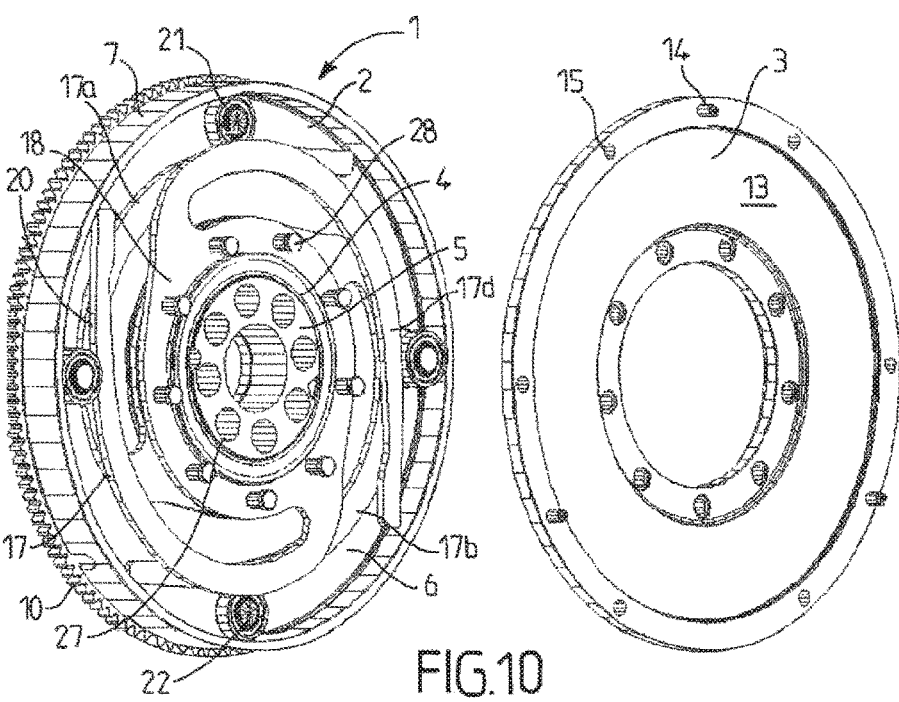
FIG. 10 is a partly exploded perspective view of the dual mass flywheel damper of FIGS. 8 and 9.

FIGS. 8 to 10 illustrate a dual mass flywheel damper 1 according to a third embodiment. This dual mass flywheel damper 1 is substantially similar to dual mass flywheel damper 1 of FIGS. 5 to 7, with the exception of the damping device which here has two pairs of flexible blades 17*a*, 17*b*, 17*c*, 17*d*. A first pair of flexible blades 17*a*, 17*b* is carried by a first annular body 18, and a second pair of flexible blades 17*c*, 17*d* is carried by a second annular body 18. Flexible blades 17*a*, 17*b*, 17*c*, 17*d* are, for each pair, symmetrical with respect to rotation axis X. The first and second annular bodies 18 are fastened to secondary flywheel 3 via a plurality of rivets 28. Here a spacer ring 35 is positioned axially between the first and second annular bodies 18.

In the embodiment depicted, the two annular bodies 18 and the two pairs of flexible blades 17*a*, 17*b*, 17*c*, 17*d* are identical. Flexible blades 17*a*, 17*b*, 17*c*, 17*d* of one of the pairs of flexible blades are angularly offset 90° with respect to the flexible blades of the other pair. Such an arrangement allows a more even distribution of the forces exerted on rolling bearing 4.

Here the cam followers have two pairs of rollers 21 mounted rotationally movably on cylindrical rods 22 fastened to primary flywheel 2.

Figure 11:
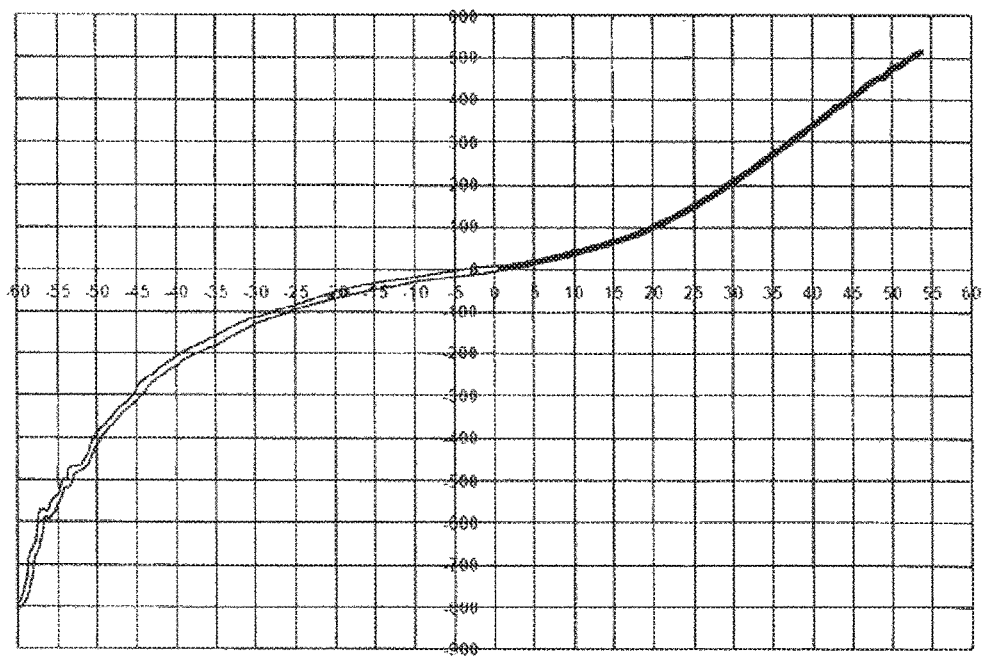
FIG. 11 is an example of a characteristic curve of a dual mass flywheel damper, representing the transmitted torque as a function of angular deflection.

FIG. 11 illustrates a characteristic curve of a dual mass flywheel damper 1 implemented according to the teaching of the invention. This characteristic curve represents the transmitted torque expressed in Nm, as a function of angular deflection expressed in degrees. The relative deflection between the input and output elements in the forward direction is depicted with dashed lines, while the deflection in the reverse direction is depicted with solid lines. Note that with a dual mass flywheel damper 1 of this kind it is possible in particular to obtain damping characteristic curves whose slope varies progressively, with no discontinuity.

Since the cam surface of the flexible blade exhibits a relatively large opening angle, it is possible to achieve a relatively large angular deflection between the input element and output element. It is thus possible to obtain the damping device that operates over a relatively wide range of torques while offering damping characteristic curves whose slope varies relatively progressively.

Advantageously, cam surfaces 20 and flexible blades 17*a*, 17*b*, 17*c*, 17*d* are arranged so that the characteristic function of the transmitted torque as a function of the angular deflection is a monotonic function.

For certain applications, cam surfaces 20 and flexible blades 17*a*, 17*b*, 17*c*, 17*d* could be arranged so that characteristics of the transmitted torque as a function of angular deflection are symmetrical in the reverse direction and the forward direction with respect to the inactive angular position.

Although the invention has been described in conjunction with several particular embodiments, it is quite apparent that it is in no way limited thereto, and that it encompasses all the technical equivalents of the means described as well as combinations thereof, if they are within the scope of the invention.

Use of the verbs "have," "comprise" or "include" and of their conjugated forms does not exclude the presence of elements or steps other than those recited in a claim. Use of the indefinite article "a" or "an" for an element or a step does not, unless otherwise indicated, exclude the presence of a plurality of such elements or steps.

In the claims, any reference character in parentheses cannot be interpreted as a limitation of the claim.

The invention claimed is:

1. A damper for an automobile clutch, the damper comprising:
   an input element and an output element rotationally movable with respect to one another around a rotation axis (X), one of the input and output elements equipped with a cam follower (21); and
   a damping device interposed between the input and output elements, the damping device having a flexible blade (17*a*; 17*b*; 17*c*; 17*d*) provided with a cam surface (20) arranged to interact with the cam follower, the cam surface extending over an opening angle (A) greater than 30°.

2. The damper according to claim 1, wherein the cam surface has a substantially concave shape when observed along the rotation axis (X), and wherein a concavity of the substantially concave shape being on the side of the rotation axis.

3. The damper according to claim 2, wherein the cam surface is concave over an entire length thereof.

4. The damper according to claim 1, wherein the opening angle (A) is greater than 60°.

5. The damper according to claim 1, wherein the opening angle (A) is between 45° and 115°.

6. The damper according to claim 1, wherein the flexible blade (17a; 17b; 17c; 17d) is metallic.

7. The damper according to claim 1, wherein the flexible blade (17a; 17b; 17c; 17d) comprises a stack of strips.

8. The damper according to claim 1, wherein the thickness of the flexible blade (17a; 17b; 17c; 17d) is greater than 3 mm.

9. The damper according to claim 1, wherein the flexible blade (17a; 17b; 17c; 17d) is rotationally coupled to one of the input and output elements.

10. The damper according to claim 1, wherein the cam surface (20) is arranged so that, for an angular deflection between the input element and output element (3) with respect to an inactive angular position, the cam follower (21) exerts a flexural force on the flexible blade (17a, 17b, 17c, 17d), producing a reaction force capable of returning the input and output elements toward the inactive angular position.

11. The damper according to claim 1, wherein the cam follower is a roller (21) mounted rotationally movably on one of the input and output elements.

12. The damper according to claim 1, wherein the cam follower (21) is disposed radially externally from the flexible blade (17a; 17b; 17c; 17d).

13. The damper according to claim 2, wherein the opening angle (A) is greater than 60°.

14. The damper according to claim 3, wherein the opening angle (A) is greater than 60°.

15. The damper according to claim 2, wherein the opening angle (A) is between 45° and 115°.

16. The damper according to claim 3, wherein the opening angle (A) is between 45° and 115°.

17. The damper according to claim 4, wherein the opening angle (A) is between 45° and 115°.

18. A damper for an automobile clutch, the damper comprising:
    an input element and an output element rotationally movable with respect to one another around a rotation axis (X), one of the input and output elements equipped with a cam follower (21); and
    a damping device interposed between the input and output elements, the damping device having a flexible blade (17a; 17b; 17c; 17d) provided with a cam surface (20) arranged to interact with the cam follower,
    the cam surface extending over an opening angle (A) greater than 30°,
    the cam surface having a substantially concave shape when observed along the rotation axis (X) such that a concavity of the substantially concave shape being on the side of the rotation axis.

19. A damper for a motor vehicle, having:
    a primary inertial flywheel intended to be fastened to the end of a crankshaft, and a secondary inertial flywheel, rotationally movable with respect to one another around a rotation axis X;
    a damper for transmitting torque and for damping rotational irregularities between the primary and secondary inertial flywheels, the damper having friction members arranged to exert a resistive frictional torque between the primary and secondary inertial flywheels upon an angular deflection between the primary and secondary inertial flywheels;
    the damper has a flexible blade rotationally coupled to one of the primary and secondary inertial flywheels and provided with a cam surface;
    and in that the damper has a cam follower carried by the other of the primary and secondary inertial flywheels and arranged to interact with the cam surface;
    the cam surface being arranged so that, for an angular deflection between the primary inertial flywheel and the secondary inertial flywheel with respect to an inactive angular position, the cam follower exerts a flexural force on the flexible blade, producing a reaction force capable of returning the primary and secondary inertial flywheels to the inactive angular position.

* * * * *